(12) United States Patent
Wu et al.

(10) Patent No.: US 8,720,995 B2
(45) Date of Patent: May 13, 2014

(54) FOLDABLE SEAT RACK

(75) Inventors: Chichun Wu, Dongguan (CN); Zhao Zhang, Dongguan (CN)

(73) Assignee: Dongguan Prestige Sporting Products Co. Ltd, Dongguan (CN)

( * ) Notice: Subject to any disclaimer, the term of this patent is extended or adjusted under 35 U.S.C. 154(b) by 315 days.

(21) Appl. No.: 13/233,972

(22) Filed: Sep. 15, 2011

(65) Prior Publication Data

US 2012/0242117 A1 Sep. 27, 2012

(30) Foreign Application Priority Data

Mar. 21, 2011 (CN) ...................... 2011 2 0074796 U

(51) Int. Cl.
*B60N 2/10* (2006.01)

(52) U.S. Cl.
USPC .......................................... 297/334

(58) Field of Classification Search
USPC ................................. 297/331, 334
See application file for complete search history.

(56) References Cited

U.S. PATENT DOCUMENTS

| 999,043 | A | * | 7/1911 | Kunz | 297/334 |
| 2,298,450 | A | * | 10/1942 | Baker | 297/183.1 |
| 2,411,125 | A | * | 11/1946 | Borsheim | 297/334 |
| 4,648,655 | A | * | 3/1987 | Moorhouse | 297/331 |

* cited by examiner

*Primary Examiner* — Milton Nelson, Jr.
(74) *Attorney, Agent, or Firm* — Morris Manning & Martin LLP; Tim Tingkang Xia, Esq.

(57) ABSTRACT

A foldable seat rack mountable between a body rack and a seat of a foldable motorized vehicle, includes main supporting rods, upper rods, lower rods, a seat base, hooks, and an elastic element. Main supporting rods are fixed on two sides of the body rack respectively. Upper rods are pivoted on upper ends of the main supporting rods respectively. Lower rods are pivoted on middle portions of main supporting rods and a rear end of seat base respectively. Hooks are fixed on the upper ends of the main supporting rods respectively. The foldable seat base has a middle shaft. Middle portions on two sides of the seat base are opened with slide slots. Two ends of the middle shaft pass through the slide slots freely and are hooked by hooks. An elastic element is placed between the front end of the seat base, and the middle shaft.

5 Claims, 5 Drawing Sheets

FOLDABLE SEAT RACK

CROSS-REFERENCE TO RELATED APPLICATION

This application claims priority to and the benefit of, pursuant to 35 U.S.C. §119(a), Chinese Patent Application No. 201120074796.7, filed Mar. 21, 2011, which is incorporated herein by reference in its entirety.

FIELD OF THE INVENTION

The present invention relates to a seat rack, and more particularly to a foldable seat rack for a foldable motorized vehicle.

BACKGROUND OF THE INVENTION

With the improvement of living standards, the life philosophy of being distinctive, fashionable, healthy, and environmentally friendly becomes popular, and fashionable and environmentally friendly articles for daily use and vehicles are favored by more and more people. Motorized vehicles evolve from being only a means of transport to being a symbol of a fashionable and healthy lifestyle, and are a means for practicing environmental protection. A foldable motorized vehicle saves storage room and is convenient to carry, and is small in size and light in weight after being folded, which makes it convenient to carry it up and down stairs, into and out of an elevator, and into a bus or metro train. Furthermore, the foldable motorized vehicle has a good appearance, and shows exquisite workmanship, thereby making it top equipment of fashion people.

For conventional foldable motorized vehicles, the folding mode is rather simple. Generally, a folding mechanism is disposed between a front wheel steering rod and a body rack, and the front wheel steering rod and the body rack are folded through the folding mechanism. However, for this mode, the size is still large after folding, and the reason lies in that the whole folding bicycle is not folded in a height direction. Particularly, the seat of the electric bicycle is normally not foldable, and occupies the largest room, thereby making the effect achieved by folding not desirable. With the ever increasing needs for living space and convenient travel in respect of carrying, obviously use requirements of people cannot be met.

Therefore, a heretofore unaddressed need exists in the art to address the aforementioned deficiencies and inadequacies.

SUMMARY OF THE INVENTION

The present invention provides a foldable seat rack with a novel frame and with a simple yet novel structure, which is convenient to fold and unfold.

The present invention, in one aspect, is related to a seat rack, which can unfold or fold a seat of a folding bicycle, save storage room, and facilitate carrying.

In one embodiment, the present invention provides a seat rack, which is mounted between a body rack and a seat, and includes main supporting rods, upper rods, lower rods, a seat base, hooks, and an elastic element, in which lower ends of the main supporting rods are fixed on two sides of the body rack respectively, lower ends of the upper rods are pivoted on upper ends of the main supporting rods respectively, upper ends of the upper rods are pivoted on two sides of a front end of the seat base respectively, lower ends of the lower rods are pivoted on middle portions of the main supporting rods respectively, upper ends of the lower rods are pivoted on two sides of a rear end of the seat base respectively, the hooks are fixed on the upper ends of the main supporting rods respectively, the seat base has a middle shaft, middle portions on two sides of the seat base are opened with slide slots, two ends of the middle shaft pass through the slide slots freely and are hooked by the hooks, one end of the elastic element is fixed on the front end of the seat base, and the other end of the elastic element is fixed on the middle shaft.

Preferably, one side of an upper end of each of the hooks is opened with an opening facing backwards towards the seat, and the openings hook end portions of the middle shaft. As the seat base rotates to drive the middle shaft to rotate when the seat rack is being folded, the openings can prevent the middle shaft from rotating, thereby achieving a locking effect.

In one embodiment, the seat rack further includes a handle, one end of the handle is fixed on the middle shaft, and the other end of the handle protrudes outwards. By pulling the handle to drive the middle shaft to move, the middle shaft departs from the hooks, thereby unlocking the seat base.

In one embodiment, the elastic element is a tension spring. The middle shaft may reset under an elastic restoring force of the tension spring, so as to achieve locking. The present invention has a simple structure and is easy to control.

Compared with the prior art, in the present invention, the upper rods and the lower rods are pivoted on the main supporting rods and are pivoted on the two ends of the seat base respectively, so that the rotatable seat rack is formed, thereby realizing the folding of the seat rack. Furthermore, the upper end of each of the main supporting rods is mounted with the hook, and a bottom portion of the seat base is disposed with the middle shaft capable of moving freely. Under a restoring force of the elastic element, the middle shaft is automatically hooked by the hooks, so that the whole seat rack is locked, thereby preventing the seat rack from being folded unexpectedly during traveling to incur dangers. After the whole seat rack is folded, the folding bicycle can save a large amount of storage room, thereby making the traveling and carrying very convenient.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE INVENTION

Figure 1:
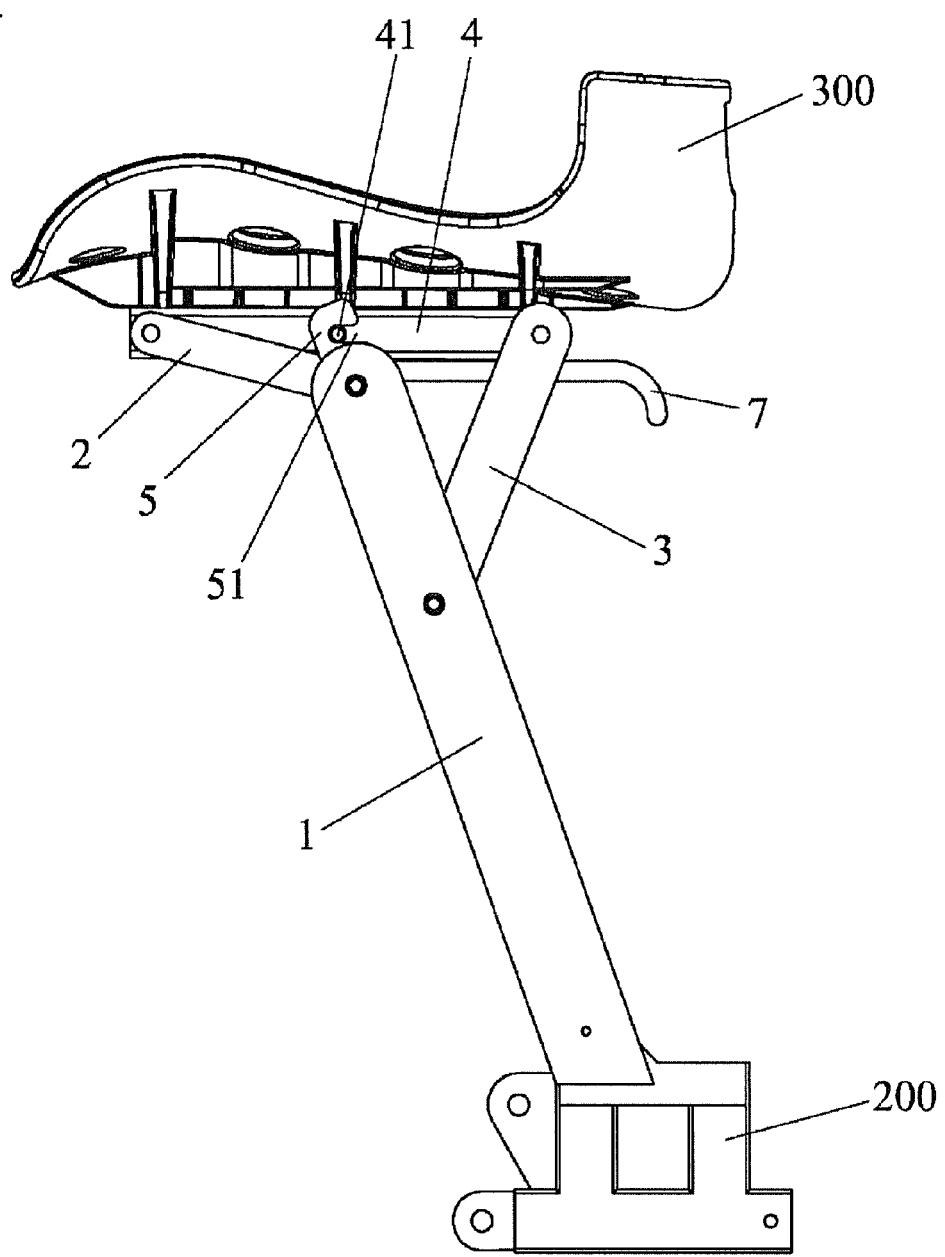
FIG. 1 is a side structural view of a seat rack according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Prior to a detailed description of the present invention(s), the following definitions are provided as an aid to understanding the subject matter and terminology of aspects of the present invention(s), and not necessarily limiting of the present invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Embodiments of the present invention are described below with reference to the accompanying drawings, and in the accompanying drawings like reference numerals represent like elements.

Figure 2:
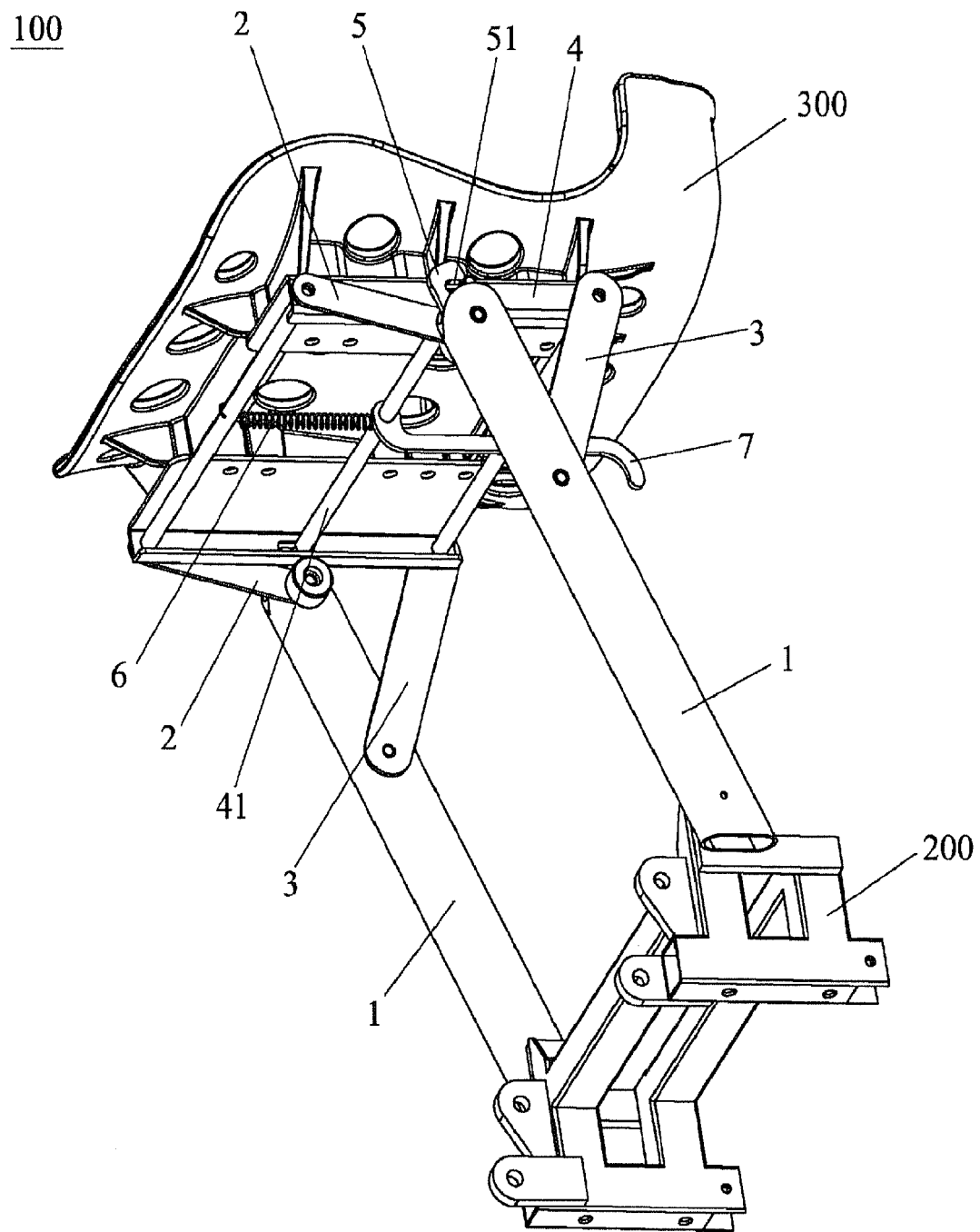
FIG. 2 is a bottom perspective view of a seat rack according to one embodiment of the present invention.
Figure 3:
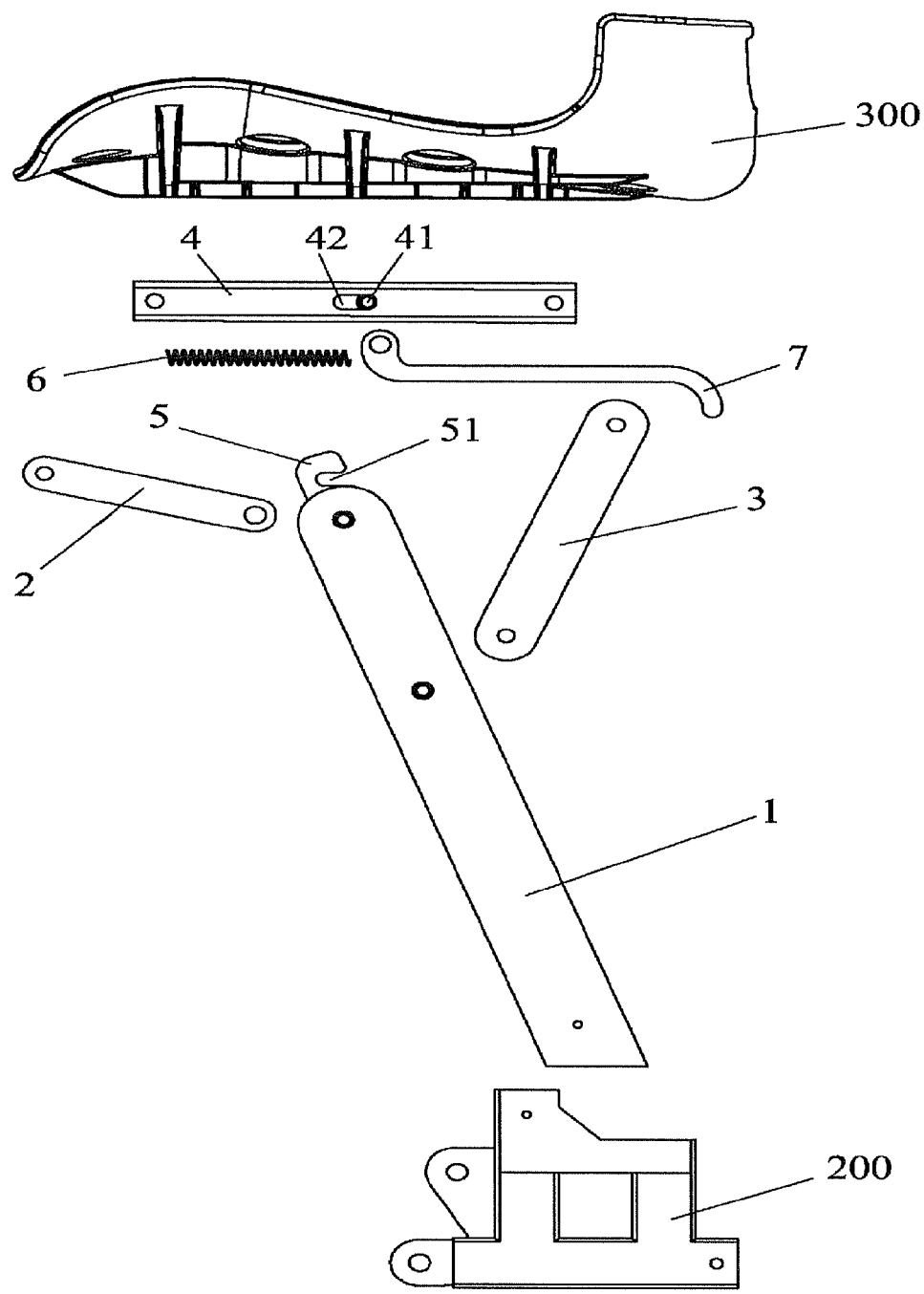
FIG. 3 is a exploded side view of a seat rack according to one embodiment of the present invention.

As shown in FIG. 1, FIG. 2 and FIG. 3, a seat rack 100 according to the present invention is mounted between a body rack 200 and a seat 300, and includes main supporting rods 1, upper rods 2, lower rods 3, a seat base 4, hooks 5, a tension spring 6, and a handle 7. Lower ends of the main supporting rods 1 are fixed on two sides of the body rack 200 respectively. Lower ends of the upper rods 2 are pivoted on upper ends of the main supporting rods 1 respectively. Upper ends of the upper rods 2 are pivoted on two sides of a front end of the seat base 4 respectively. Lower ends of the lower rods 3 are pivoted on middle portions of the main supporting rods 1 respectively. Upper ends of the lower rods 3 are pivoted on two sides of a rear end of the seat base 4 respectively. The hooks 5 are fixed on the upper ends of the main supporting rods 1 respectively. One side of an upper end of each of the hooks 5 is opened with an opening 51 facing backwards towards the seat 300. The seat base 4 has a middle shaft 41. Middle portions on two sides of the seat base 4 each are opened with a slide slot 42. Two ends of the middle shaft 41 pass through the slide slots 42 freely and are hooked by the openings 51 of the hooks 5. One end of the tension spring 6 is fixed on the front end of the seat base 4, and the other end of the tension spring 6 is fixed on the middle shaft 41. One end of the handle 7 is fixed on the middle shaft 41, and the other end of the handle 7 protrudes backwards from the seat 300. The handle 7 can drive the middle shaft 41 to depart from the hooks 5, thereby unlocking the seat base 4.

Figure 4:
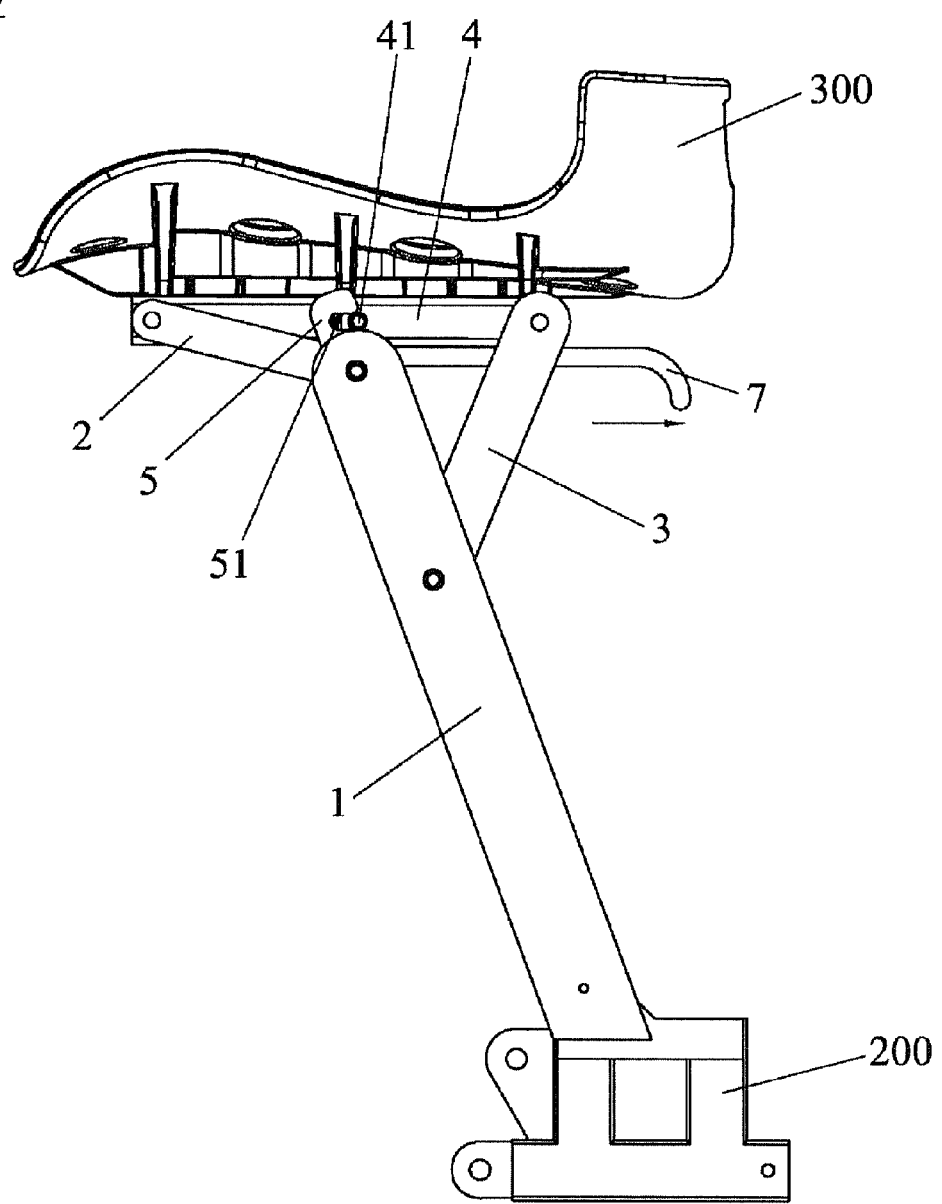
FIG. 4 is a side view of a seat rack when it is unfolded according to one embodiment of the present invention.
Figure 5:
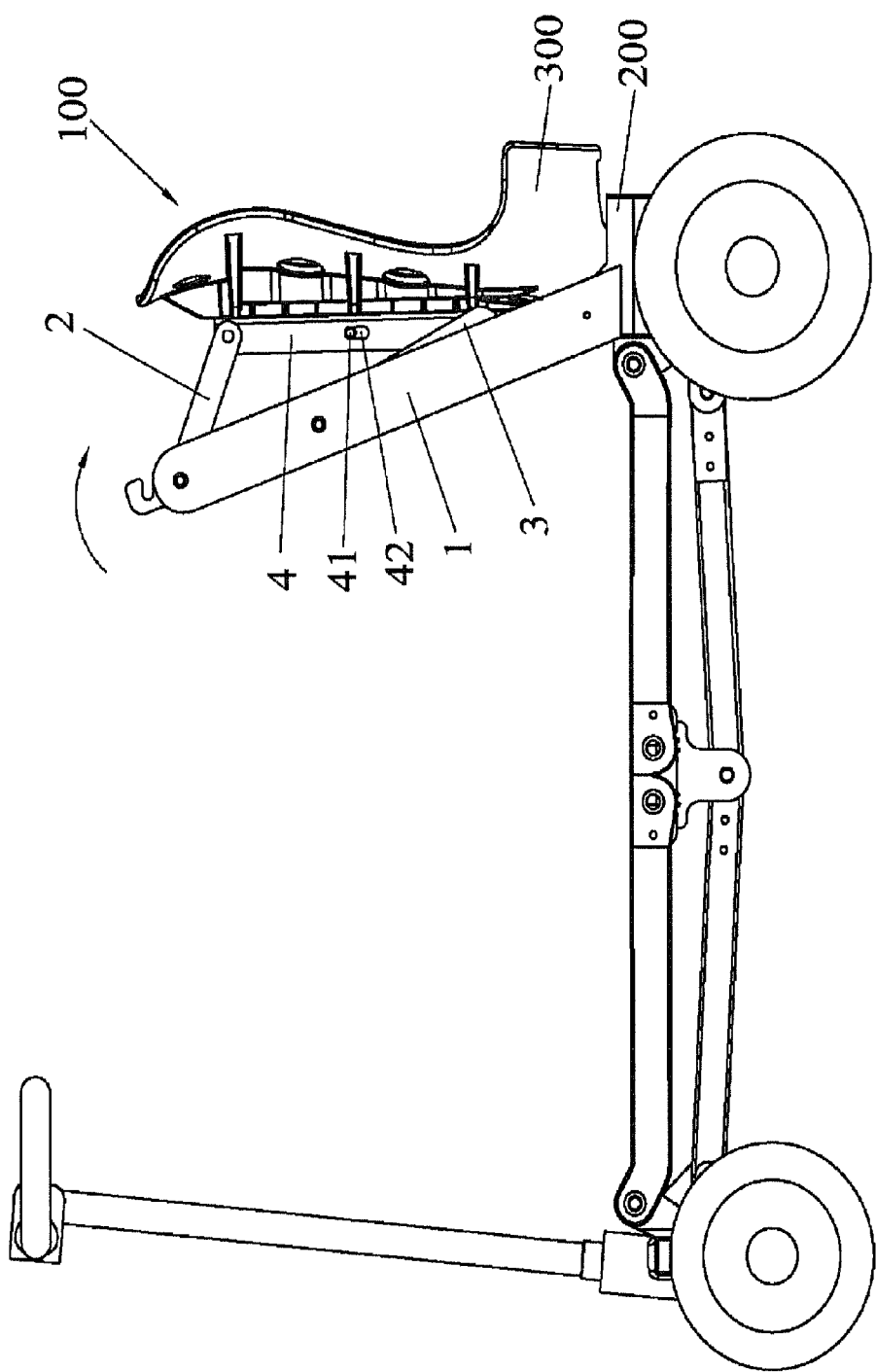
FIG. 5 a side view of a seat rack when it is mounted on a foldable motorized vehicle and completely folded according to one embodiment of the present invention.

As shown in FIG. 4 and FIG. 5, the two main supporting rods 1 are fixed on the two sides of the body rack 200 in a forwards inclined manner. The upper rods 2, the lower rods 3, and the seat base 4 form the seat rack 100. The seat 300 is fixed on an upper surface of the seat base 4. When the seat rack 100 is completely unfolded, the upper rods 2 and the lower rods 3 support the seat base 4 so that the seat base 4 is level. The tension spring 6 pulls the middle shaft 41 so that the middle shaft 41 is located at left ends of the slide slots 42. At the moment, the two ends of the middle shaft 41 are located in the openings 51 of the hooks 5, and the middle shaft 41 is fixed, so that the seat base 4 is fixed, thereby achieving locking. When the seat rack 100 is required to be folded, the handle 7 is pulled backwards manually, the handle 7 drives the middle shaft 41, and the middle shaft 41 moves from the left ends of the slide slots 42 to right ends of the slide slots 42, so that the two ends of the middle shaft 41 depart from the openings 51 of the hooks 5, and meanwhile the tension spring 6 is pulled, and the seat rack 100 is unlocked. At the moment, the seat 300 can be pushed to rotate backwards, and the seat 300 rotates backwards to drive the seat base 4 to rotate, so that the upper rods 2 rotate about the positions where the upper rods 2 are pivoted on the main supporting rods 1, the lower rods 3 rotate about the positions where the lower rods 3 are pivoted on the main supporting rods 1, and finally the seat 300 is folded on right sides of the main supporting rods 1.

In the present invention, the upper rods 2 and the lower rods 3 are pivoted on the main supporting rods 1, and are pivoted on the two ends of the seat base 4 respectively, so that the rotatable seat rack 100 is formed, thereby realizing the folding of the seat rack 100. Furthermore, the upper end of each of the main supporting rods 1 is mounted with the hook 5, and a bottom portion of the seat base 4 is disposed with the middle shaft 41 capable of moving freely. Under a restoring force of the tension spring 6, the middle shaft 41 is automatically hooked by the hooks 5, so that the whole seat rack 100 is locked, thereby preventing the seat rack 100 from being folded unexpectedly during traveling to incur dangers. Furthermore, the middle shaft 41 is disposed with the handle 7, and only the handle 7 is required to be pulled to unlock and fold the seat 300, thereby achieving a simple structure and use convenience. After the whole seat rack 100 is folded, the folding bicycle can save a large amount of storage room, thereby making the traveling and carrying very convenient.

Sizes and mounting methods of the main supporting rods 1 and the seat 300 involved in the seat rack 100 according to the present invention are all known to those of ordinary skill in the art, which will not be elaborated herein.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A foldable seat rack for use with a body rack and a seat of a foldable motorized vehicle, comprising:
   (a) main supporting rods;
   (b) upper rods;
   (c) lower rods;
   (d) a seat base;
   (e) hooks; and
   (f) an elastic element,
   wherein lower ends of the main supporting rods are fixed on two sides of the body rack respectively when in use, lower ends of the upper rods are pivoted on upper ends of the main supporting rods respectively, upper ends of the upper rods are pivoted on two sides of a front end of the seat base respectively, lower ends of the lower rods are pivoted on middle portions of the main supporting rods respectively, upper ends of the lower rods are pivoted on two sides of a rear end of the seat base respectively, the hooks are fixed on the upper ends of the main supporting rods respectively, the seat base has a middle shaft, middle portions on two sides of the seat base are opened with slide slots, two ends of the middle shaft pass through the slide slots freely and are hooked by the hooks, one end of the elastic element is fixed on the front end of the seat base, and the other end of the elastic element is fixed on the middle shaft.

2. The foldable seat rack according to claim 1, wherein one side of an upper end of each of the hooks is opened with an opening facing backwards towards the seat when in use, and the openings hook end portions of the middle shaft.

3. The foldable seat rack according to claim 1, wherein the seat rack further comprises a handle, one end of the handle is fixed on the middle shaft, and the other end of the handle protrudes outwards.

4. The foldable seat rack according to claim 1, wherein the elastic element is a tension spring.

5. A foldable motorized vehicle comprising a foldable seat rack according to claim 1.

\* \* \* \* \*